Oct. 3, 1939.  F. L. O. WADSWORTH  2,174,905
GLASS FEEDING AND SEVERING MECHANISM
Original Filed March 18, 1933
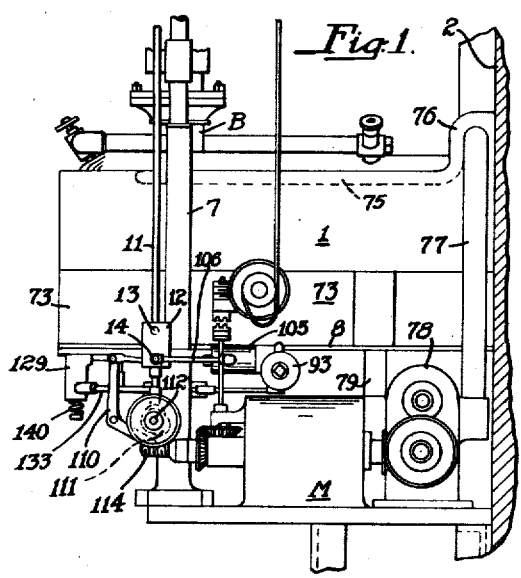
Fig. 1.
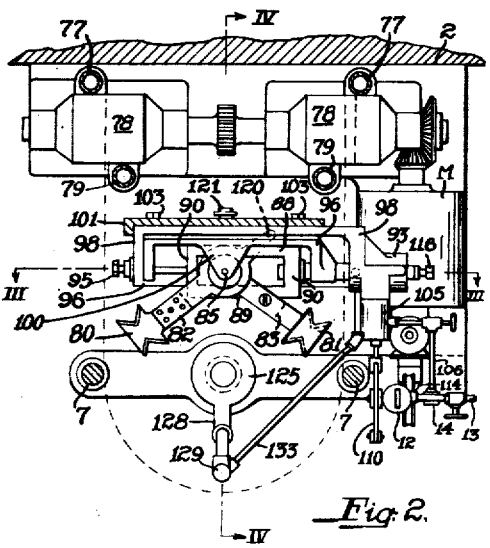
Fig. 2.
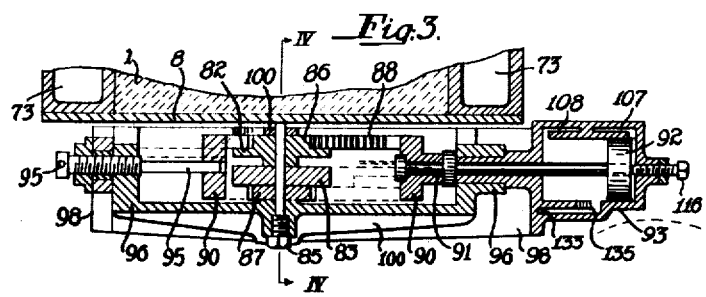
Fig. 3.
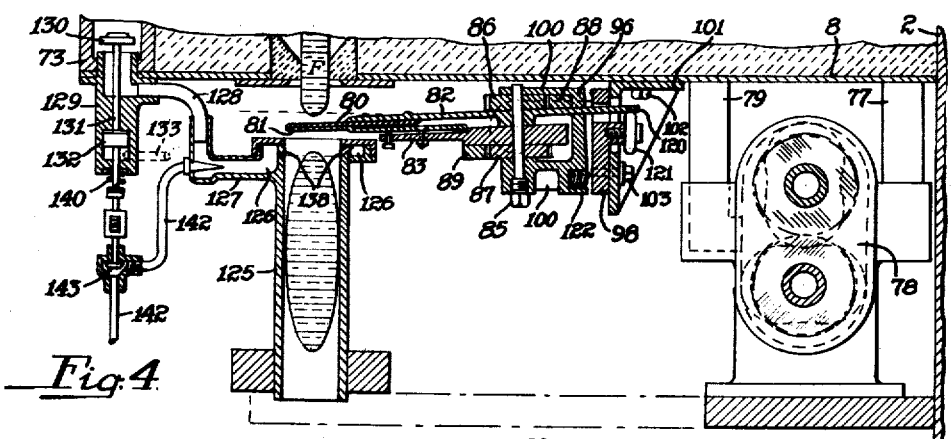
Fig. 4.
Fig. 5.
INVENTOR
FRANK L.O. WADSWORTH, deceased,
MILDRED M. WADSWORTH, Admx.
By Green & McCallister
His Attorneys Patented Oct. 3, 1939

2,174,905

UNITED STATES PATENT OFFICE 2,174,905

GLASS FEEDING AND SEVERING MECHANISM

Frank L. O. Wadsworth, deceased, late of Pittsburgh, Pa., by Mildred M. Wadsworth, administratrix, Pittsburgh, Pa.; said Wadsworth assignor to Ball Brothers Company, Muncie, Ind., a corporation of Indiana Original application March 18, 1933, Serial No. 661,563. Divided and this application December 18, 1936, Serial No. 116,505

16 Claims. (Cl. 49—55)

This invention relates to improvements in mechanism for severing a stream of molten glass into a succession of individual mold charges or gobs, and is a division of copending application Serial No. 661,563, filed March 18, 1933.

The principal object of the present invention is to provide a form of double acting, high speed shear which will separate a flowing stream of molten glass into a series of mold charges of definite predetermined form and weight without the formation of shear marks on the ends of the severed charges.

Another object of the present invention is to provide a shear mechanism which drops or travels with the stream at the time of severance and thereby accelerates the delivery of each severed charge of molten material to the mold or the forming receptacle in which it is subsequently pressed or shaped to the desired form.

A further object of the present invention is to provide auxiliary means for assisting the dropping shear blades in accelerating the delivery of each severed charge of molten glass to the mold or forming receptacle.

These and other objects which will be hereinafter made apparent to those skilled in this particular art are accomplished by means of the present invention, one embodiment of which is described in the following specification and illustrated in the accompanying drawing, wherein:

Figure 1 is a general side elevation partially in section of a feeder boot showing the relative position of the improved shear mechanism;

Fig. 2 is a plan view partially in section of the shear mechanism;

Fig. 3 is a cross section taken on line III—III of Fig. 2;

Fig. 4 is a vertical section through the shear mechanism taken on the lines IV—IV of Figs. 2 and 3, and Fig. 5 is an enlarged transverse section through the two shear blades shown in Figs. 2 and 4.

In the drawing is illustrated the improved shear mechanism in connection with a forehearth or feeder boot 1 which forms an extension of the main glass tank, the front wall of which is indicated at 2 and which is provided near its outer end with a submerged delivery orifice F of the usual form. The flow of glass through the orifice F is controlled by an air bell B which extends through the roof of the forehearth 1 and is preferably so operated that glass issues through the orifice in a stream of regularly recurrent enlarged sections connected together by necked portions of reduced diameters. Air for operating the bell and for effecting a discharge of glass through the orifice F is supplied through a conduit 11 that is connected to a suitable cylinder (not shown) and to fluid pressure conduits 13 and 14 through a cam actuated timer valve 12.

To reduce the heat losses due to radiation through that portion of the forehearth which is in contact with the molten material, a hollow U-shaped box casting 73 is provided which surrounds the lower portion of the forehearth and which is preferably made of a high chromium nickel steel alloy having a relatively low heat conductivity and which is not deleteriously affected by temperatures of 2000° F. The exposed side and bottom surfaces of the box 73 are preferably covered, to minimize radiation losses, with a white asbestos paint or enamel or with thin sheets of similar material cemented thereon, and the interior of the box may be highly heated in any suitable way. It is preferred, however, to keep the box at a high temperature by forcing into it a portion of the excess and highly heated gases which fill the upper part of the forehearth 1 and which tend to escape therefrom through the opening around the upper part of the bell B. These gases are withdrawn through a flue 75 which is formed in the roof blocks of the forehearth and communicates at its forward end with the bell opening and at its rear end with a small dome 76 that adjoins the front wall 2 of the main tank chamber.

Heavy pipe 77 of high thermal resistivity, for example Fahrite, leads from this dome to some simple form of rotary pump 78 (the twin drum Root blower shown in Figs. 1 and 2) which is positioned beneath the forehearth and is driven by a suitable variable speed motor M. The delivery nozzles of the pump are connected directly to the rear end of the U-shaped box 73 by short vertical pipes 79, 79 and the rotor members are revolved at such speed as to maintain a relatively low pressure of two or three pounds (gauge) in said box which is utilized (as hereinafter more fully explained) to accelerate the delivery of the severed charge to a receiving mold or forming receptacle.

The improved high speed shear mechanism for severing the stream issuing through the orifice F into a series of successive mold charges of definite form and weight without scarring or chilling the molten material at the plane of severance, comprises a pair of double ended, or double acting, shear blades 80—81, which are adjustably secured to the ends of the arms 82—83, that are rotatably mounted, one above the other, on a vertical stud pin 85. These arms are respectively provided with the spur pinions 86—87, which are engaged, on opposite sides, by the toothed racks 88—89, that form the side bars of a reciprocable box shaped member 90. The inner (right hand) end of this member is pivotally connected to the outer extremity of a piston rod 91, which is attached to a piston 92 in the cylinder 93; and the opposite (left hand) end is slidably engaged with a guide bar 95, that is adjustably mounted in the adjacent portion of a frame 96, which is pivotally supported, at both ends, on the U-shaped head 98 of the cylinder 93, and which is provided near its center, with bracket supports 100—100, for the stud pin 85. This entire assemblage of parts, 80 to 100 inclusive, is supported, as a unit, on the angle bracket 101, which is bolted to the floor plate 8 of the forehearth (see Figs. 2 and 4); and the joint adjustment of this bracket, and of the head 98 with respect thereto—which can be effected by passing the clamp bolts 102 and 103 through slots in the angle bracket 101—makes it possible to bring the path, and the plane of movement, of the shear blades 80—81 into any desired relationship to the flow orifice F.

The cylinder 93 is provided at one side with a timer valve member 105, which is connected to the pressure conduit 14, by a pipe 106, and to the opposite ends of the cylinder 93 by the passages 107 and 108. The piston, or plunger rod, of this timer valve is actuated by a bell crank lever 110, and a cam 111 which is mounted on the cam shaft 112 and is driven by a worm and worm wheel connection with the shaft 114 of the motor M (see Figs. 1 and 2). When it is desired to operate the shear mechanism—to sever the stream of glass flowing from the delivery orifice F—the timer valve is moved to open communication between the pipe 14—106 and the passage 107, and the admission of compressed fluid to the right hand end of the cylinder 93 forces the piston 92 to the left, and rotates the shear blade elements 80—82—86, and 81—83—87, in opposite direction, about the axis of the stud pin 85. The shear blades 80—81 meet and cross each other at the central point of the piston stroke—where the speed of movement is at or near its maximum—and continue on until the blade 80 has reached the position initially occupied by the blade 81, and vice versa—the length of the piston stroke and the limits of its movement being controlled by the joint adjustment of the shouldered guide rod 95 and the set screw 116. In order to slow down the last half of this movement, and bring the parts to rest without appreciable shock or jar, the timer valve cam 111 is so shaped that the port 107 is closed before the piston reaches the end of its stroke, and the port 108—which is open to the atmosphere during the first half of the movement—may also be partially, or wholly, closed after the shear blades have met and passed each other; and the resultant drop in pressure behind the piston—aided by an accompanying trapping and compression of air in front of the piston—will gradually check and arrest its final movement to the left.

The parts will remain in the position last described until the continued rotation of the timer valve cam 111 again operates the timer valve to establish communication between the pressure supply lines 14—106 and the port 108 (the opposite port 107 being now open to the atmosphere), and thus move the piston 92, and the parts actuated thereby through a reversed cycle of action which is controlled in the same manner as before. In this reversed or return movement the stream of glass will be severed by the opposite edges of the symmetrically shaped double ended blades 80—81, which are so mounted and adjusted (as best shown in Figs. 4 and 5) that they will act in the same manner for both directions of movement.

It is obvious that the above described form of double acting shear mechanism will operate to sever the stream of glass much more quickly than any form of shear in which the blade or blades are successively closed and opened at each severing operation; and that the danger of marring or marking the glass at the plane of severance, and of heating the cutting edges by continued contact with the molten material, is thus eliminated.

The improved high speed severing device is also provided with means for accelerating the downward movement of the severed charge of glass immediately after it is separated from the oncoming stream, and thus increasing the speed with which this charge is delivered to the receiving receptacle. This desirable result is accomplished by providing one of the shear arms (e. g., the arm 82) with an extension 120, which passes through elongated slots in the members 96—98 and 101, and which is adapted to engage and ride over a roller 121 that is mounted on the frame 98 at a point immediately behind the stud pin 85 (Figs. 2 and 4). The engagement of the arm 120 with the roller 121 rocks the frame 96 on its trunnion supports in the cylinder head 98, and thus imparts to the transversely moving shear blades 80—81 a rapid downward movement (at the instant of crossing) which is, in turn, communicated to the severed charge of glass (see Fig. 4). This movement also carries the upper surfaces of the cutting elements out of engagement with the lower end of the oncoming stream of glass, and thus assists in further reducing the time of contact between the shear blades and the molten material upon which they act. The short interval during which the frame 96 is rocked to the position shown in Fig. 4 is determined by the width of the extension arm 120; and after this arm has passed over the roller 121 the parts are restored to normal position by the compression spring 122.

Auxiliary means have also been provided by which the downward movement of the severed charge of glass may be further accelerated, after the shear blades 80—81 have ceased to act. Various devices may be provided for this purpose; but as here shown the desired result is obtained by providing a removable guard tube 125, whose inner diameter is slightly larger than that of the severed charge and whose upper end is enlarged to form an ejection chamber 126 that is connected to the interior of the U-shaped box 73 by the double elbow pipe joints 127—128, and the valve box 129. The guard tube 125 is supported by side posts 7 which also serve to support the sheet metal floor 8 of the forehearth 1. The box 129 contains a disc valve 130, which is attached to a stem 131, that is secured, at its lower end to a piston 132; and the space below this piston is connected, by the pipe 133, with a port 135 on the lower side of the cylinder 93 (see Fig. 3). This port is so positioned, and is of such length, that it will be opened to the space behind the advancing piston (in either the left hand or right hand movement of the latter) at the central point in its stroke; and when so opened the compressed fluid in the cylinder 93 will be admitted to the space below the piston 132 and will lift the disc valve 130 from its seat. The opening of the valve 130 will permit the compressed and highly heated gas in the box 73 to rush out, through the connections 127—128, into the ejection head 126, and to be discharged therefrom, through the narrow downwardly inclined annular slots 138, against the upper end portion of the freshly severed charge of glass in the guard tube 125; and this downwardly flowing annular sheet of hot gas performs two functions, i. e., that of further accelerating the falling movement of the mold charge, and that of preventing the surfaces of this charge from coming into contact with, and being chilled by, the surrounding tube 125.

The valve 130 will remain open until the drop in pressure behind the piston 92 will permit the adjusted tension of the spring 140 to overcome the corresponding pressure on the piston 132; and these two effects may be so controlled by the adjusted action of the timer valve 105, and the adjusted force of the spring 140, that the flow of hot gas from the box 73 is cut off as soon as the severed charge has passed out of the tube 125.

In Fig. 4 has been shown a slight modification of the ejection "accelerator" which has just been described. This alternative form of construction differs from that illustrated in Figs. 1 and 2, only in having a supplementary pipe connection 142, which leads from the elbow 127 to a suitable source of gaseous or liquid fuel, and which is provided with a control valve 143 that is flexibly coupled to the lower end of the piston stem 131. When the piston 132 is lifted by the admission of compressed air to the pipe 133 (see supra) the valve elements 130 and 143 are concurrently opened, to permit of a stream of fuel to enter the ejection chamber 126 and be mixed with the flow of fluid from the box 73. When this supplementary device is used the inlet pipes 77 of the pump 78 are disconnected from the flue connections 75—76, and are opened to the atmosphere, and the pump is then used to keep the box 73 charged with air under a pressure which is slightly less than that maintained in the fuel supply connection 142. The air thus pumped into the box 73 will become highly heated by radiation and conduction from the adjacent walls of the forehearth, and will in turn serve as an insulating envelope for those walls; and when the valve 130 is opened to admit this heated air to the chamber 126, the mixture of air and fuel therein will be projected from the annular slot 138, and will be immediately ignited by the hot glass to form a downwardly moving sheet of flame which will perform the same function and accomplish the same results that are secured by the use of the superheated gas discharge from the box 73.

The cam which operates the timer valve 12— to control the up and down movements of the bell B—is preferably mounted on the same shaft 112 that carries the shear actuating timer valve cam 111; and it will be understood that these two cams may be manually adjusted to act in any desired phase relationship, and thus effect the severing and delivery of successive mold charges at any desired point or points in the reciprocating movement of the bell member. It will also be understood that if it is desired to cut off only one charge in each complete cycle of this reciprocating movement, these two cams will be so shaped as to operate in a two to one ratio—i. e., the cam 111 acts to produce only one half cycle movement of the piston 92 (to the right or left) while the other cam is acting to produce a full cycle movement (up and down) of the bell.

When the successively formed and severed masses of glass are to be delivered in regular order to the molds of a forming (press, or press-and-blow) machine, it is desirable to operate the mold table of the machine in a definite and predetermined synchronism with respect to the feeder mechanism; and this may be accomplished either by connecting the motor shaft 114 to the mold table—if the movement of the latter is continuous—or by the provision of a third timer-valve system, which is actuated by the cam shaft 112, and which controls the start and stop movements of the said table. The provision of means for accelerating the downward delivery of the severed charges of glass facilitates the use of a continuously moving mold table, because it greatly shortens the time during which the mold receptacle must be retained in its receiving position; and this, in turn, cooperates with the continuous flow action of the feeder in increasing the rate of production obtainable with the entire feeder-forming-machine organization.

With the preceding disclosure as a guide, those skilled in this art will be able to devise many other specific forms of apparatus for practicing the procedure hereinbefore described, and for utilizing, in whole or in part, the various features of improvement which characterize my present invention, as defined in the accompanying claims.

What is claimed as new and desired to be secured by Letters Patent is:

1. A glass severing mechanism comprising a pair of double edged, oscillating shear blades, means for periodically oscillating said blades to swing said blades across each other in cutting relation the blades being so arranged that as they move in one direction the cutting action is effected by one edge of each blade and as they move in the opposite direction by the opposite edge of each blade, and means responsive to the oscillation of one of said blades in each direction for tilting the same as they cross each other in cutting relation.

2. A glass severing mechanism comprising a pair of shear blades mounted for oscillation about a common ax's, means for oscillating said blades about such ax's to move them across each other in cutting relation, mean responsive to the movement of one blade for tilting the same as they cross each other in cutting relation and yieldable means for returning said blades to their non-tilted position.

3. A glass severing mechanism comprising a pair of double edged shear blades, a rack and gear mechanism for swinging said blades in opposite directions, a piston connected to said rack, a cylinder in which said piston reciprocates, and means for alternately connecting the ends of said cylinder to a source of motive fluid to move said piston and rack in opposite directions and oscillate said shear blades, said severing mechanism being so constructed and arranged that the blades approach and cross each other during each stroke of the piston whereby the severance is accomplished by one set of edges as the blades move in one direction and by the other set of edges as they move in the opposite direction.

4. A glass severing mechanism comprising a pair of double acting shear blades mounted for oscillation about a common axis, a gear secured to each of said blades, a rack bar engaging each of said gears, a piston connected to said rack bars, a cylinder in which said piston reciprocates, means for alternately connecting the ends of said cylinder to a source of motive fluid, to oscillate said blades, and means responsive to the oscillation of one of said blades for tilting the common axis of the blades.

5. A glass severing mechanism comprising a pair of shear blades mounted for oscillation in opposite directions, an arm projecting from one of said blades, a common shaft for said blades, a pivoted frame in which the ends of said shaft are mounted, means for oscillating said blades, and means adapted to coact with said projecting arm during the oscillation of said blades for turning said frame and tilting said blades.

6. A glass severing mechanism comprising a pair of double edged shear blades, a shaft on which said blades are mounted, an arm projecting from one of said blades, a pivoted frame in which the ends of the shaft are journaled, a reciprocating motor for oscillating said blades, and means adapted to coact with said arm during the oscillation of one of said blades for tilting said frame.

7. A glass severing mechanism comprising a pair of double edged shear blades, a shaft on which said blades are mounted, an arm projecting from one of said blades, a pivoted frame in which the ends of said shaft are journaled, a reciprocating motor, means connecting said motor to said blades whereby the reciprocation thereof swings said blades around said shaft, and means adapted to coact with said projecting arm during the swinging movement of said blades for tilting said frame.

8. The combination comprising a forehearth for molten glass having a submerged discharge outlet therein through which the glass flows in a stream, a hollow member surrounding said forehearth, means for maintaining elastic fluid under pressure within said member, means for severing a charge of molten glass from the stream flowing through said outlet, and means operating in timed relation to said severing means for directing elastic fluid from said member against said charge to accelerate the delivery thereof to a forming receptacle.

9. In combination with a container for molten glass having a submerged discharge outlet therein, a hollow member surrounding said forehearth, means for maintaining an elastic fluid under pressure within said member, a guard tube beneath said outlet, and connected to said hollow member, a valve controlling communication between said guard tube and said member, means for periodically severing the glass flowing through said outlet, and means responsive to the operation of said severing means for actuating said valve to deliver fluid from said member to said guard tube.

10. In combination with a forehearth for molten glass having a submerged discharge outlet therein, through which the glass therein is discharged in a stream, a sleeve disposed below said discharge outlet and having inclined ports leading into an ejection chamber, a hollow member surrounding such forehearth and connected to said ejection chamber, means for maintaining elastic fluid under pressure within said hollow member, a valve controlling the connection between said hollow member and said ejection chamber, means for severing a charge of glass from the stream and impelling it into said sleeve, and means responsive to the operation of said severing means for actuating said valve whereby fluid pressure is directed against said charge to accelerate its passage through said tube.

11. In combination with a forehearth for molten glass having a submerged discharge outlet therein through which glass flows in a stream, means for severing a charge from said stream, means for withdrawing and storing the heated gases from said forehearth, and means responsive to the operation of said severing means for directing such stored gases against the severed charge to accelerate its delivery to a receiving receptacle.

12. In combination with a forehearth for molten glass having a submerged outlet therein through which glass is discharging in a stream, means for periodically severing such stream to form individual mold charges, means for withdrawing and storing the heated gases from said forehearth, and means responsive to the severing of said stream for directing such stored and highly heated gases under relatively high pressure against the severed charges to accelerate the delivery thereof to a receiving receptacle.

13. In combination with a forehearth for molten glass having a submerged outlet therein through which glass is discharging in a stream, means for periodically severing such stream to form individual mold charges, means for withdrawing the highly heated gases from the forehearth and for maintaining such gases under pressure, and means responsive to the operation of said severing means for directing the highly heated gases against the severed charges to accelerate the delivery thereof to a receiving receptacle.

14. In combination with a forehearth for molten glass having a submerged outlet therein through which glass is discharging in a stream, a hollow member surrounding said forehearth, means for withdrawing the highly heated gases from said forehearth and forcing the same into said hollow member, means for periodically severing said stream to form individual mold charges, and means responsive to the operation of said severing means for directing the gases from said member against said severed charges to accelerate the delivery thereof to a forming receptacle.

15. In combination with a container for molten glass having a submerged outlet therein through which glass is discharging in a stream, a pair of oscillating shear blades coaxially mounted below said forehearth, a reciprocating motor for oscillating said blades to cause the blades to cross each other in the path of said stream and sever a mold charge therefrom, and means for accelerating the delivery of the severed charges to a receiving mold including a hollow box-like member surrounding said container, means for withdrawing the heated gases from the container and forcing the same under pressure into said box-like member, and means responsive to the operation of said reciprocating motor for directing the gases in said box-like member against the severed charge.

16. A glass severing mechanism comprising a pair of arms coaxially mounted for oscillation in opposite directions, a shear blade carried by each of said arms, one of said arms having a projecting portion thereon, means for oscillating said arms to move said blades across each other in cutting relation, and means for tilting said blades while in cutting relation including a fixed roller over which the projecting portion of said arm rides as the blades move across each other in cutting relation.

MILDRED M. WADSWORTH,
*Administratrix of the Estate of Frank L. O. Wadsworth, Deceased.*

CERTIFICATE OF CORRECTION.

Patent No. 2,174,905.                                        October 3, 1939.

MILDRED M. WADSWORTH, ADMINISTRATRIX of FRANK L. O. WADSWORTH, deceased.

It is hereby certified that error appears in the printed specification of the above numbered patent requiring correction as follows: Page 4, first column, line 34, claim 6, strike out the words "of one"; and second column, line 3, claim 10, for "such" read said; and that the said Letters Patent should be read with this correction therein that the same may conform to the record of the case in the Patent Office.

Signed and sealed this 5th day of December, A. D. 1939.

(Seal)                                                                         Henry Van Arsdale,
                                                                                Acting Commissioner of Patents.

motor for directing the gases in said box-like member against the severed charge.

16. A glass severing mechanism comprising a pair of arms coaxially mounted for oscillation in opposite directions, a shear blade carried by each of said arms, one of said arms having a projecting portion thereon, means for oscillating said arms to move said blades across each other in cutting relation, and means for tilting said blades while in cutting relation including a fixed roller over which the projecting portion of said arm rides as the blades move across each other in cutting relation.

MILDRED M. WADSWORTH,
*Administratrix of the Estate of Frank L. O. Wadsworth, Deceased.*

CERTIFICATE OF CORRECTION.

Patent No. 2,174,905. October 3, 1939.

MILDRED M. WADSWORTH, ADMINISTRATRIX of FRANK L. O. WADSWORTH, deceased.

It is hereby certified that error appears in the printed specification of the above numbered patent requiring correction as follows: Page 4, first column, line 34, claim 6, strike out the words "of one"; and second column, line 3, claim 10, for "such" read said; and that the said Letters Patent should be read with this correction therein that the same may conform to the record of the case in the Patent Office.

Signed and sealed this 5th day of December, A. D. 1939.

(Seal)

Henry Van Arsdale,
Acting Commissioner of Patents.